United States Patent
Caldeira Ferraz Da Costa et al.

(10) Patent No.: US 12,384,682 B2
(45) Date of Patent: Aug. 12, 2025

(54) METHOD FOR PRODUCING GRAPHENE OXIDE

(71) Applicant: National University of Singapore, Singapore (SG)

(72) Inventors: Mariana Caldeira Ferraz Da Costa, Singapore (SG); Valeria Spolon Marangoni, Singapore (SG); Antonio Helio de Castro Neto, Singapore (SG)

(73) Assignee: National University of Singapore, Singapore (SG)

( * ) Notice: Subject to any disclaimer, the term of this patent is extended or adjusted under 35 U.S.C. 154(b) by 36 days.

(21) Appl. No.: 17/304,859

(22) Filed: Jun. 28, 2021

(65) Prior Publication Data

US 2023/0002232 A1 Jan. 5, 2023

(51) Int. Cl.
*C01B 32/198* (2017.01)

(52) U.S. Cl.
CPC ...... *C01B 32/198* (2017.08); *C01P 2004/136* (2013.01); *C01P 2004/17* (2013.01)

(58) Field of Classification Search
CPC .............. C01B 32/198; C01P 2004/17; C01P 2004/136
See application file for complete search history.

(56) References Cited

U.S. PATENT DOCUMENTS

| | | | | |
|---|---|---|---|---|
| 2020/0039828 A1* | 2/2020 | Chang | .................. | C01B 32/192 |
| 2022/0024770 A1* | 1/2022 | Zhang | .................. | C01B 32/198 |
| 2022/0362999 A1* | 11/2022 | Broughton | ............. | B33Y 40/20 |

FOREIGN PATENT DOCUMENTS

| | | | | |
|---|---|---|---|---|
| CN | 109399613 A | * | 3/2019 | ........... C01B 32/184 |
| CN | 110034242 A | * | 7/2019 | ........... C01B 32/198 |
| WO | WO-2021009704 A1 | * | 1/2021 | ............. B29C 64/30 |

OTHER PUBLICATIONS

English machine translation of CN109399613A (Year: 2019).*
Chang, Chih-I., et al. "A unique two-step Hummers method for fabricating low-defect graphene oxide nanoribbons through exfoliating multiwalled carbon nanotubes." Journal of the Taiwan Institute of Chemical Engineers 45.5 (2014): 2762-2769.*
Chen, Ji, et al. "An improved Hummers method for eco-friendly synthesis of graphene oxide." Carbon 64 (2013): 225-229.*
Yang, Min, Satoshi Moriyama, and Masayoshi Higuchi. "Selective edge modification in graphene and graphite by chemical oxidation." Journal of Nanoscience and Nanotechnology 14.4 (2014): 2974-2978.*
Qin, Jiadong, et al. "Room temperature production of graphene oxide with thermally labile oxygen functional groups for improved lithium ion battery fabrication and performance." Journal of Materials Chemistry A 7.16 (2019): 9646-9655.*
Hossain, Md Zakir. "Reversibility and homogeneity of graphene oxidation." 表面科学学術講演会要旨集 第 32 回表面科学学術講演会. 公益社団法人 日本表面真空学会, 2012.*

(Continued)

*Primary Examiner* — Richard M Rump
(74) *Attorney, Agent, or Firm* — S&F/WEHRW

(57) ABSTRACT

Provided herein is a method for preparing graphene-oxide, the method including contacting graphene and at least one oxidant in a solution including at least one acid solvent thereby forming graphene-oxide.

15 Claims, 12 Drawing Sheets

(56) References Cited

OTHER PUBLICATIONS

NM Huang, HN Lim, CH Chia, MA Yarmo & MR Muhamad (2011) Simple room-temperature preparation of high-yield large-area graphene oxide, International Journal of Nanomedicine, , 3443-3448.*

Kumar, Navneet, and Vimal Chandra Srivastava. "Simple synthesis of large graphene oxide sheets via electrochemical method coupled with oxidation process." ACS omega 3.8 (2018): 10233-10242.*

Araújo, Mariana P., et al. "Tuning the surface chemistry of graphene flakes: New strategies for selective oxidation." RSC advances 7.23 (2017): 14290-14301.*

Rathour, Rishi Karan Singh, and Jayanta Bhattacharya. "A green approach for single-pot synthesis of graphene oxide and its composite with Mn3O4." Applied Surface Science 437 (2018): 41-50.*

Islam AE, Kim SS, Rao R, Ngo Y, Jiang J, Nikolaev P, Naik R, Pachter R, Boecki J, Maruyama B. Photo-thermal oxidation of single layer graphene†. RSC Adv. 2016, 6, 42545. DOI: 10.1039/c6ra05399h.

Mitoma N, Nouchi R, Tanigaki K. Photo-oxidation of Graphene in the Presence of Water. J. Phys. Chem. C 2013, 117, 1453-1456. DOI: 10.1021/jp305823u.

Liu L, Ryu S, Tomasik MR, Stolyarova E, Jung N, Hybertsen MS, Steigerwald ML, Brus LE, Flynn GW. Graphene Oxidation: Thickness-Dependent Etching and Strong Chemical Doping. Nano Lett. 2008, vol. 8, No. 7 1965-1970. DOI: 10.1021/nl0808684.

Zhao S, Surwade SP, Li Z, Liu H. Photochemical oxidation of CVD-grown single layer graphene. Nanotechnology 2012, 23, 355703. DOI: 10.1088/0957-4484/23/35/355703.

Kudus MHA, Zakaria MR, Akil H, Javed FUF. Oxidation of graphene via a simplified Hummers' method for graphenediamine colloid production. J. of King Saud University—Science 32 (2020) 910-913. DOI: 10.1016/j.iksus.2019.05.002.

Mariana C.F. Costa et.al., Accelerated Synthesis of Graphene Oxide from Graphene, Nanomaterials 2021, 11, 551.

* cited by examiner

METHOD FOR PRODUCING GRAPHENE OXIDE

TECHNICAL FIELD

The present disclosure generally relates to methods for the preparation of graphene oxide (GO). More particularly, the present disclosure relates to methods for preparing GO directly from graphene.

BACKGROUND

The presence of functional groups attached to graphene is known to extend the functionality of this unique two-dimensional (2D) material. GO is an important form of functionalized graphene that disperses in water and other polar solvents. Because of the presence of oxygenated groups, such as carboxyl, hydroxyl, and epoxy, GO can be further functionalized with various organic molecules, making it a versatile chemical functionalization platform with extensive potential for a wide range of important applications, such as water treatment, energy storage, environment, and medicine.

In addition to the chemical synthesis, the choice of the carbon source used as the starting material plays an important role in the final quality of GO. More specifically, different types of graphite and the reaction conditions can lead to significant modifications in the physical and chemical properties of GO, such as the lateral size of the flake, the number of layers, and disorder. As a result, the final properties of GO are sensitive to the materials and methods of production. The properties of the thus prepared GO enable specific applications. For example, highly oxidized GO flakes with sub-micrometer size are of great interest for biomedical applications, whereas larger GO flakes with lower degrees of oxidation are commonly used in nanocomposites.

Hummers' method is the most widely used approach for preparing GO, and involves the oxidation of graphite using potassium permanganate ($KMnO_4$) and sodium nitrate ($NaNO_3$), in concentrated sulfuric acid ($H_2SO_4$) solution. Despite its popularity, Hummers' method presents several drawbacks, including long reaction times for oxidation, up to hundreds of hours, and the formation of toxic gasses such as nitrogen dioxide/dinitrogen tetroxide ($NO_2/N_2O_4$) due to the presence of $NaNO_3$ as an intercalant agent. Additionally, Hummer's method not only uses large amounts of concentrated $H_2SO_4$ and $KMnO_4$ to ensure satisfactory oxidation of graphite flakes, but also huge amounts of water are required to remove excess ions after oxidation to guarantee highest degree of purity of the sample. As a result, the process is costly, laborious, energy intensive, generates large amounts of waste, and presents safety and health concerns. Moreover, since the oxidation is not homogeneous—because various oxygenated groups are chemically bonded throughout the GO surface, it is extremely difficult to control the degree of oxidation, and some residual graphite is still left unless long periods of sonication are used, to produce just a few layers GO.

Numerous strategies have been developed to address the issues mentioned above. For example, to reduce the oxidation time, stronger oxidizing agents, such as potassium ferrite ($K_2FeO_4$) or electrochemistry approaches have been used. Other strategies exclude the usage of $NaNO_3$ in order to avoid the formation of toxic gasses, and to facilitate the disposal of waste due to the absence of $Na^+$ and $NO_3^-$ ions. However, the elimination of $NaNO_3$ usually requires compensatory strategies to maintain the efficiency of Hummers' method. Increasing the amounts of $KMnO_4$ and $H_2SO_4$, and the introduction of new components, such as phosphoric acid ($H_3PO_4$) to the reaction, or conducting reactions at elevated temperatures (as high as 90° C. and above) have also been developed to address the shortcomings of Hummers' method.

There is thus a need for improved methods for preparing GO that overcome at least some of the challenges discussed above.

SUMMARY

The present disclosure relates to a rapid and more economic method of preparing GO with a highly controllable degree of oxidation. As described in greater detail below, graphene flakes can be used instead of graphite as the starting material to produce GO with micrometer lateral dimensions and high oxidation degree. The higher surface area of unstacked graphene sheets in comparison with pilled layers of graphite, favors accelerated oxidation reactions, considerably reducing the overall reaction rate. Also, as $NaNO_3$ is not required to assist in increasing the interlayer distance among graphene layers in graphite, and therefore the methods described herein are safer and more ecofriendly than conventional modified Hummers' method.

FIG. 1 illustrates the method to produce GO where the starting material is graphene flakes instead of graphite flakes as prescribed in the conventional modified Hummers method. The method described herein advantageously does not require $NaNO_3$ and, consequently, does not generate the toxic gasses $NO_2/N_2O_4$ and dramatically reduces oxidation time required to prepare GO.

In a first aspect, provided herein is a method for preparing graphene-oxide, the method comprising: contacting graphene and at least one oxidant in a solution comprising at least one acid solvent thereby forming graphene-oxide, wherein the graphene is selected from the group consisting of graphene sheets, fullerenes, graphene nanotubes, graphene nanoscrolls, and graphene nanoribbons.

In certain embodiments, the graphene consists of 10 or less layers of graphene or graphene aggregates comprising graphene particles consisting of 10 or less layers of graphene.

In certain embodiments, the solution is substantially free of graphite.

In certain embodiments, the solution does not comprise nitrate salts or nitric acid.

In certain embodiments, the method does not comprise sonication.

In certain embodiments, the at least one oxidant is selected from the group consisting of permanganate, ferrate, chlorate, chlorite, ruthenium tetroxide, hydrogen peroxide ($H_2O_2$) and combinations thereof.

In certain embodiments, the at least one oxidant is potassium permanganate, potassium chlorate, or sodium chlorate.

In certain embodiments, the at least one acid solvent is selected from the group consisting of sulfuric acid, phosphoric acid, chlorosulfonic acid, fluorosulfonic acid, and combinations thereof.

In certain embodiments, the step of contacting graphene and the at least one oxidant occurs at a temperature between 0-25° C.

In certain embodiments, the step of contacting graphene and the at least one oxidant occurs for between 5 minutes to 24 hours.

In certain embodiments, the method comprises: contacting graphene flakes and at least one oxidant selected from the group consisting of permanganate, ferrate, chlorate, chlorite, osmium tetroxide, ruthenium tetroxide, and combinations thereof in a solution comprising at least one acid solvent selected from the group consisting of sulfuric acid, phosphoric acid, chlorosulfonic acid, fluorosulfonic acid, trifluoromethanesulfonic acid, and combinations thereof; at a temperature between 0-25° C. thereby forming graphene-oxide, wherein each of the graphene flakes independently consists of 10 or less layers of graphene.

In certain embodiments, the solution is substantially free of graphite.

In certain embodiments, the solution does not comprise nitrate salts.

In certain embodiments, the method comprises: contacting graphene flakes with potassium permanganate in a solution comprising sulfuric acid at a temperature between 2-25° C. thereby forming graphene-oxide, wherein each of the graphene flakes independently consists of 10 or less layers of graphene; and the solution is substantially free of graphite.

In certain embodiments, the step of contacting the graphene flakes and the at least one oxidant occurs for 24 hours or less.

In certain embodiments, the solution consists of concentrated sulfuric acid.

In certain embodiments, the graphene flakes and potassium permanganate are present in the solution in a mass ratio of 10:1 to 1:10.

In certain embodiments, the graphene flakes are present in the solution at a concentration of 0.1-5% m/v.

In certain embodiments, the method comprises: contacting graphene flakes with potassium permanganate in a solution consisting of concentrated sulfuric acid at a temperature between 2-25° C. for a period of 24 hours or less thereby forming graphene-oxide, wherein the graphene flakes and potassium permanganate are present in the solution in a mass ratio of 1:4 to 1:5; the graphene flakes are present in the solution at a concentration of 2-4% m/v; each of the graphene flakes independently consists of 10 or less layers of graphene; and the solution is substantially free of graphite.

BRIEF DESCRIPTION OF DRAWINGS

The above and other objects and features of the present disclosure will become apparent from the following description of the disclosure, when taken in conjunction with the accompanying drawings.

DETAILED DESCRIPTION

Definitions

Figure 1:
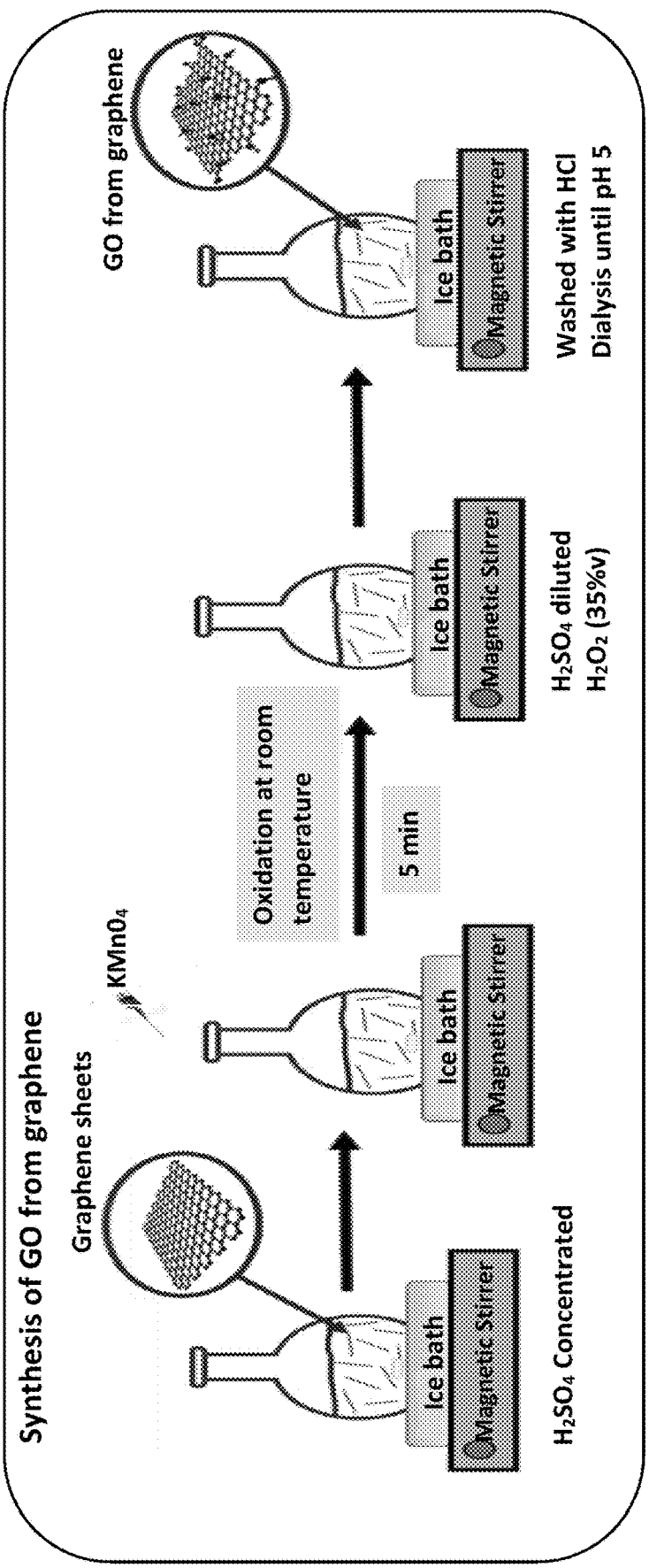
FIG. 1 depicts an exemplary schematic representation of the method of preparing GO directly from graphene sheets in accordance with certain embodiments described herein.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present teachings, whether explicit or implicit herein.

It should be understood that the order of steps or order for performing certain actions is immaterial so long as the present teachings remain operable. Moreover, two or more steps or actions may be conducted simultaneously.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

As used herein, the term "graphene" refers to a polycyclic aromatic material consisting of a single layer of a plurality of $sp^2$ hybridized carbon atoms that lie in the same plane with covalent bonds. The plurality of carbon atoms may form six-membered rings as a standard repeating unit, or may further include 5-membered rings and/or 7-membered rings. Graphene may exist as a single layer (or sheet) of graphene or few-layer graphene having 2, 3, 4, 5, 6, 7, 8, 9, or 10 layers (or sheets) of graphene that can be bonded together through van der Waals forces. The graphene plane may also adopt three-dimensional shapes, such as in the case of fullerenes, graphene nanotubes, graphene nanoscrolls, and graphene nanoribbons.

As used herein, the term "graphite" refers to a crystalline form of carbon atoms consisting of several layers of graphene pilled together (11 or greater, greater than 20, greater than 30, greater 40, or greater than 50 layers). Graphite consists of carbon atoms strongly bonded in plane and weak interactions in between out-of-plane carbon atoms due to van der Waals forces.

As used herein, the term "graphene oxide" refers to graphene with one or more oxygen containing functionalities, such as epoxide, hydroxyl, carbonyl, carboxyl, and the like, present on the basal plane and/or edge of the graphene.

As used herein, the term "substantially free of graphite" when used in connection with a solution refers to a solution having a concentration of graphite of less than 5% m/v, less than 4% m/v, less than 3% m/v, less than 2% m/v, less than 1% m/v, less than 0.9% m/v, less than 0.8% m/v, less than 0.7% m/v, less than 0.6% m/v, less than 0.5% m/v, less than 0.4% m/v, less than 0.3% m/v, less than 0.2% m/v, less than 0.1% m/v, less than 0.05% m/v, less than 0.01% m/v, or 0% m/v or otherwise undetectable amount of graphite present.

As used herein, the term "concentrated sulfuric acid" has a concentration of at least 95-98% m/m.

The present disclosure provides a method for preparing graphene-oxide, the method comprising: contacting graphene and at least one oxidant in a solution comprising at least one acid solvent thereby forming graphene-oxide.

It has been discovered that when graphene consisting of ten layers of graphene or less is used in the methods described herein, a surprising increase in oxidation rates are observed, which drastically decreases reaction times, enables the use of less aggressive agents, avoids the use of nitrates/nitric acid, simplifies purification, and sonication steps.

Graphene useful in the present method includes single-layer graphene, few-layer graphene consisting of between 2-10 layers, and combinations thereof. The graphene may take the form of particles in the shape of graphene flakes. Each graphene particle can independently consist of 10 layers or less, 8 layers or less, 7 layers or less, 6 layers or less, 5 layers or less, 4 layers or less, 3 layers or less, 2 layers or less, or 1 layer. In certain embodiments, the graphene consists of between 1-10 layers, 1-9 layers, 1-8, layers, 1-7 layers, 1-6 layers, 1-5 layers, 1-4 layers, 1-3 layers, 1-2 layers, 2-10 layers, 3-10 layers, 4-10 layers, 5-10 layers, 6-10 layers, 7-10 layers, 8-10 layers, 9-10 layers, 2-8 layers, 3-7 layers, 4-6 layers, and combinations thereof.

The graphene may be in the form of a sheet, fullerene, graphene nanotube, graphene nanoscroll, graphene nanoribbon, or mixtures thereof. In certain embodiments, the graphene is in the form of a graphene sheet.

The graphene may exist as discrete particles of single-layer and/or few-layer graphene or as graphene aggregates comprising one or more particles of single-layer and/or few-layer graphene. The graphene aggregates may have a particle size of between 10 to 100 nm. Under certain reaction conditions described herein, the graphene may reversibly form graphene aggregates in situ during the oxidation reaction.

The graphene particles can have any lateral dimension, but are typically between 0.05 to 5 µm. In certain embodiments, the graphene has an average longest lateral dimension of between 0.001 to 1 µm, 0.01 to 1 µm, 0.01 to 10 µm, 0.01 to 20 µm, or mixtures thereof. In certain embodiments, the graphene has an average longest lateral dimension of between 0.1 nm to 2.5 nm or 1 nm to 2 nm.

Figure 8:
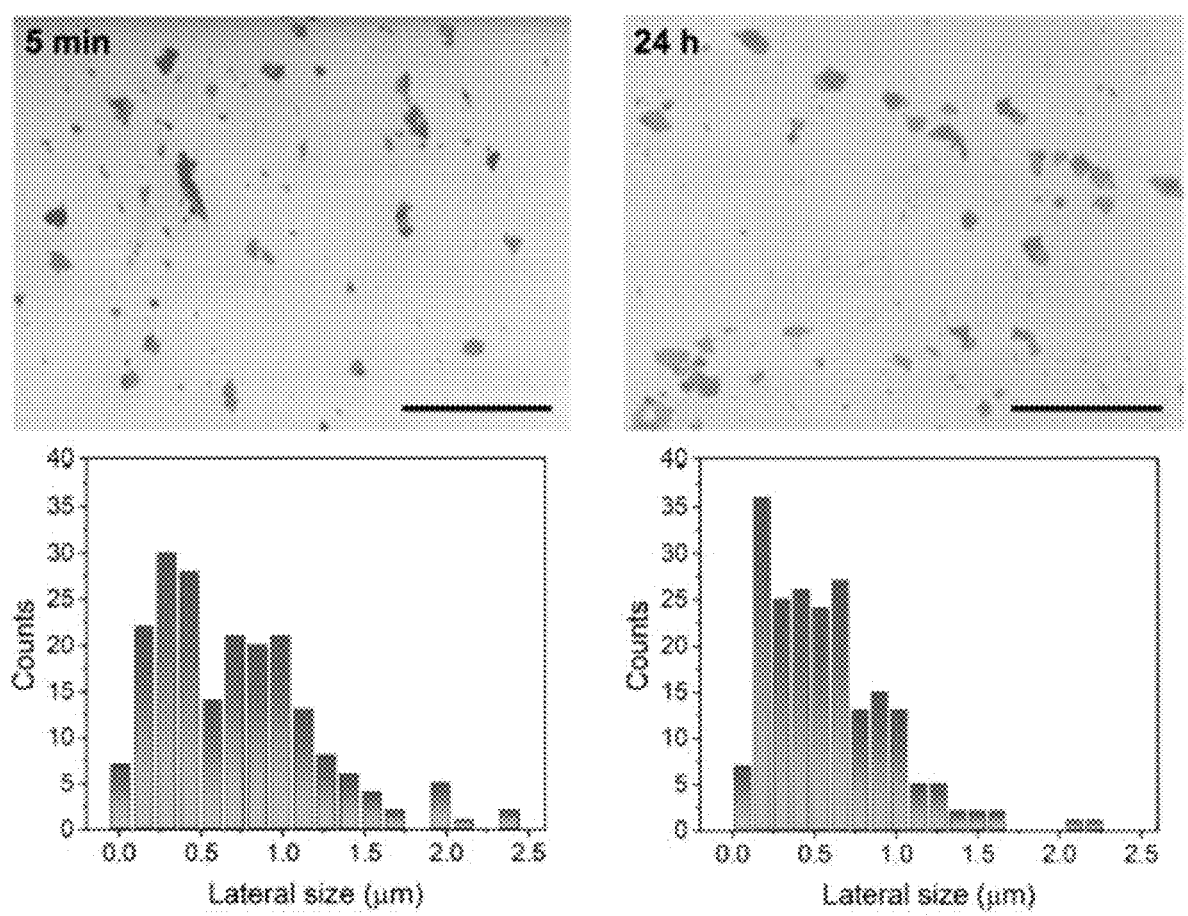
FIG. 8 depicts SEM images and lateral size distributions for the GO flakes after 5 min and 24 h of oxidation in accordance with certain embodiments described herein.

As demonstrated by the results in FIG. 8, the methods described herein advantageously produce GO having substantially the same average lateral size of graphene starting material. The average lateral size of the GO produced after 5 minutes and 24 hours of oxidation in FIG. 8 were 0.54±0.06 µm and 0.45±0.05 µm, respectively. In certain embodiments, the GO prepared using the methods described herein has an average lateral size that is ±95, ±90, ±80, ±70, ±60%, ±50%, ±40%, ±30%, ±20%, ±17%, or ±10% of the average lateral size of the graphene starting material.

Depending on the source and purity of the graphene utilized in the methods described herein, the graphene can comprise graphite impurities. In certain embodiments, the graphene comprises 5% m/m or less, 4% m/m or less, 3% m/m or less, 2% m/m or less, 1% m/m or less, 0.5% m/m or less, 0.1% m/m or less, or 0.01% m/m or less of graphite impurities. In certain embodiments, the graphene contains an undetectable amount of graphite impurities.

In certain embodiments, the solution is substantially free of graphite. In certain embodiments, the solution comprises graphite at a concentration less than 5% m/v, less than 4% m/v, less than 3% m/v, less than 2% m/v, less than 1% m/v, less than 0.9% m/v, less than 0.8% m/v, less than 0.7% m/v, less than 0.6% m/v, less than 0.5% m/v, less than 0.4% m/v, less than 0.3% m/v, less than 0.2% m/v, less than 0.1% m/v, less than 0.05% m/v, less than 0.01% m/v, 0% m/v or otherwise undetectable amount of graphite.

The graphene can be present in the solution at a concentration between 0.1-5% m/v.

The at least one oxidant may be any oxidant known to those of skill that is useful in the oxidation of graphene to GO. Exemplary oxidants include, but are not limited to, salts of permanganate, ferrate, hydrogen peroxide, osmate, ruthenate, chlorate, or chlorite; or osmium tetroxide or ruthenium tetroxide, and combinations thereof. In instances in which the oxidant is permanganate, ferrate, hydrogen peroxide, chlorate, or chlorite, any cation suitable for forming a salt of the oxidant may be used in practicing the methods described herein. However, a person of ordinary skill in the art will recognize that certain salts may be more advantageous than others due for example, to their solubility, stability, reactivity, etc. The salts can include one or more cations selected from Group I (e.g., lithium, sodium, or potassium) or Group II (calcium or magnesium) of the periodic table. In certain embodiments, the at least one oxidant is potassium permanganate, sodium permanganate, potassium ferrate, sodium chlorate, potassium chlorate, or combinations thereof. In certain embodiments, the at least one oxidant is potassium permanganate or hydrogen peroxide.

In instances in which potassium permanganate is used as the oxidant, the graphene flakes and potassium permanganate can be present in the solution in a mass ratio of 2:1 to 1:5, respectively.

The solution can comprise at least one acid solvent selected from the group consisting of sulfuric acid, phosphoric acid, chlorosulfonic acid, fluorosulfonic acid, and combinations thereof. In certain embodiments, the solution consists of the at least one acid solvent. In certain embodiments, the at least one acid solvent is sulfuric acid. The sulfuric acid can be concentrated sulfuric acid (e.g., 95-98% m/m) or non-concentrated sulfuric acid (e.g., 60-95% m/m). The sulfuric acid can be diluted and have a mass fraction of less than 90% due to the use of graphene as initial material.

Due in part to the use of graphene, the method described herein does not require the use of nitrates and nitric acid. Thus, in certain embodiments, the solution does not comprise a nitrate salt or nitric acid.

Due to the use of graphene, the oxidation quickly proceeds at room temperature or lower. In certain embodiments, the step of contacting the graphene and the oxidant is conducted at a temperature between 2-25° C. In certain embodiments, the graphene and the oxidant are contacted at a lower temperature and the reaction is then allowed to warm to the room temperature as the reaction progresses. For example, the graphene and the oxidant can be contacted at a temperature of between 2-4° C. and the reaction can then be allowed to warm to 20-25° C. In certain embodiments, the step of contacting the graphene and the oxidant occurs at 20-25° C.

The amount of time the graphene and the oxidant are allowed to remain in contact can depend on desired oxidation state of GO, the choice of reagents and stoichiometry, solvent, number of layers present in the graphene, and reaction temperature, but is typically between 1 minute to 24 hours. In certain embodiments, the graphene and the oxidant are allowed to remain in contact between 5 minutes and 3 hours.

The degree of oxidation of the GO can be adjusted by varying the concentration of graphene in the reaction. More particularly, if the concentration of the graphene is increased, a smaller extension of the basal plane of the graphene would be exposed to oxidizing agents, yielding GO with a lower degree of oxidation. Alternatively, for lower concentrations of graphene, the flakes can have greater mobility in the solvent, such that the oxidizing agents may reach a larger extension of the basal plane of the graphene yielding GO with a higher degree of oxidation. In this sense, the basal plane or the edges of graphene flakes may be adjustably oxidized on demand.

In certain embodiments, method described herein further includes isolating the GO. Isolating the GO may take place by, for example, centrifugation or filtration. In certain embodiments, the methods further include washing the GO after isolating the graphene oxide. For example, in certain embodiments, the GO is washed with one or more portions of a solvent including hydrochloric acid, water, alcohols, or combinations thereof to remove impurities.

In certain embodiments, the methods described herein further comprise the step of reducing the GO to yield reduced or partially reduced graphene oxide. In such instances, the subsequent reduction step can be conducted using well known GO reduction methods using a "one-pot" or a "multi-pot" synthesis.

As shown in Table 1, the amount of carboxyl (O—C=O) groups rapidly increases within the first 40 minutes of the reaction and does not increase to a significant extent thereafter. In contrast, the amount of epoxy (C—O) groups quickly increases within the first 30 minutes of the reaction and continues to slowly increase as shown by data collected at 24 hours.

The method described herein can produce GO having an oxidation state in terms of C:O molar ratio between 5:1 to 2:1. In certain embodiments, the method described herein can be produce GO having an oxidation state of in terms of C:O molar ratio of 2:1 or less.

Given that the method described herein utilizes graphene as a starting material, the method does not require the addition of nitric acid or nitrate salts or a sonication step in order to achieve high yields of GO. In certain embodiments, the solution does not contain a nitrate salt, such as sodium nitrate or nitric acid. In certain embodiments, the method does not comprise the use of sonication and/or further comprise a sonication step.

Figure 2:
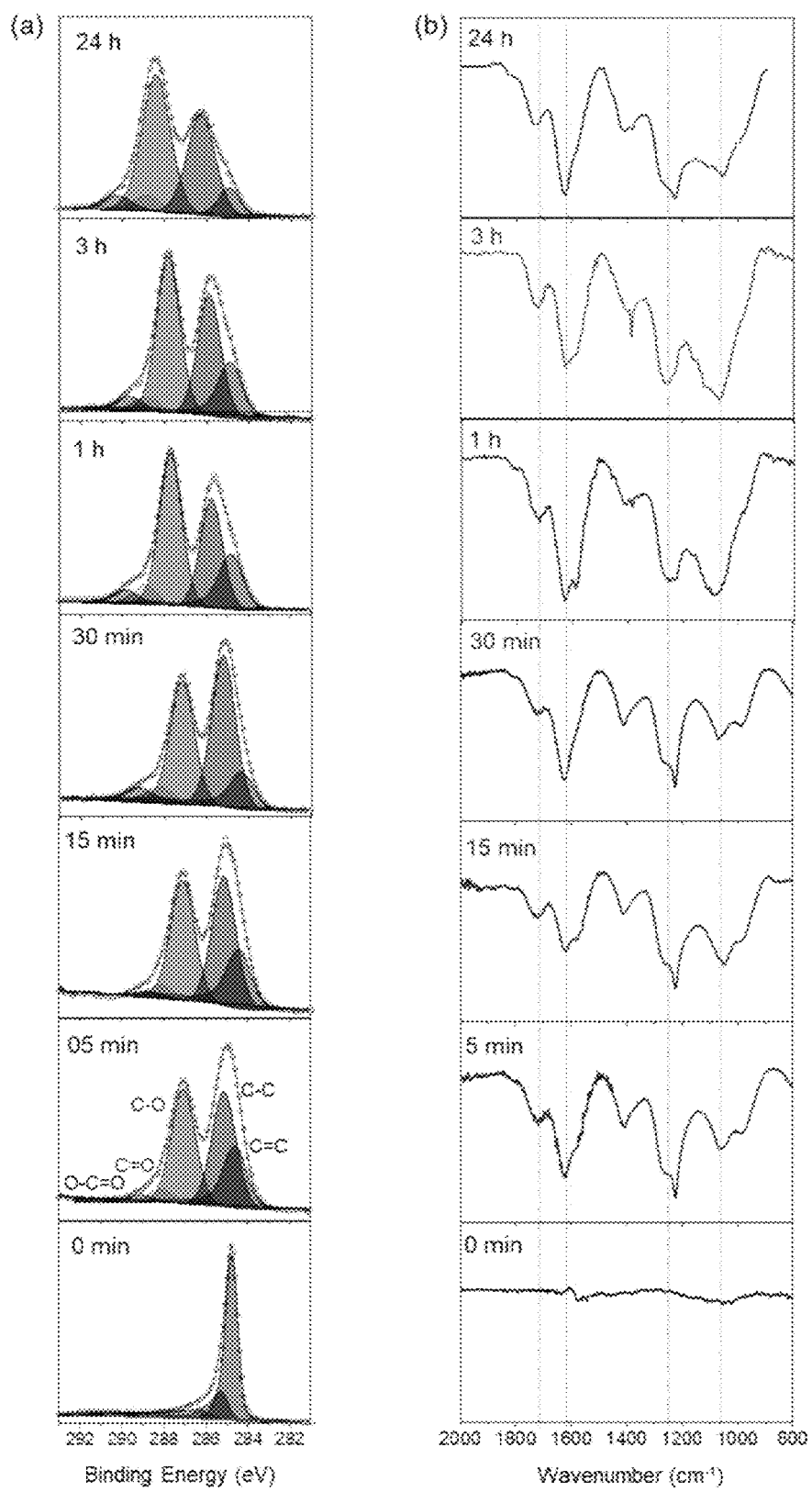
FIG. 2 depicts (a) high resolution C1s X-ray photoelectron spectroscopy (XPS) and (b) Fourier transform infrared (FTIR) spectra for the initial graphene (0 min) and GO prepared after 5, 15, and 30 min and 1, 3, or 24 hours of reaction in accordance with certain embodiments described herein.

The evolution of the increase of oxygenated groups in the graphene structure as a function of the oxidation time is demonstrated in FIG. 2a. After deconvolution of X-ray photoelectron spectroscopy (XPS) spectra, five main peaks are identified: 284.8 eV (C=C), 285.7 eV (C—C), 287.7 eV (C—O), 288.8 eV (C=O) and 289.8 (O—C=O). After only 5 minutes of oxidation, one can observe a significant relative increase in the oxygen-based groups, indicating that the process of oxidation of graphene sheets is efficient and extremely fast due to the exposure of a higher surface area of graphene. Although not as pronounced, by further increasing the oxidation time, these oxygen-based functional groups continue to increase. However, it is noteworthy that most of the oxidation process occurs in the first minutes (or even shorter time scale) of reaction.

The thickness and lateral size of GO obtained from atomic force microscopy (AFM) images do not change significantly after 5 minutes of reaction, which indicates that most of the modifications occur very quickly, beyond the limit of observation due to restrictions of the experimental setup conditions.

Looking closer at the spectra and comparing the percentages shown in Table 1, changes in the relative quantity of each group are also of note. For example, the ratio between O—C=O and C—O groups is greater after 24 hours when compared to 5 minutes, indicating that, after longer periods of oxidation, the graphene structure is saturated with epoxy groups. Comparing the XPS C1s C—O peak position with first principles calculations, it is estimated that the C:O ratio is close to 2:1.

FIG. 2b shows the evolution of the FTIR spectra for graphene and GO obtained directly from graphene as a function of the oxidation time. For GO, the spectra are typical for this oxygenated functionalized graphene structure, in which the resonances around 1054, 1260 and 1418 cm' are attributed to the C—OH (alkoxy) stretching, C—O (epoxy) stretching and O—H (hydroxyl) deformation vibrations, respectively. These are compared with first principle calculations, which find C—OH bending modes at 1089-1095 cm', the epoxy symmetric stretch at 1254 cm', and C—OH hydrogen wag mode at 1509 cm', which may be in the origin of the resonance observed at 1418 cm'. The carboxylic acid group appears at 1733 cm' with the carbonyl (C=O) stretching, calculated to lie at 1691 cm'. The peak at 1620 cm' is usually attributed to the non-oxidized domains in the graphene structure, but it can also contain contributions of the adsorbed water molecules. From first-principle calculations, it is found that the hydroxyl at the flake edge also has two modes in this region, calculated to lie at 1596 and 1615 $cm^{-1}$. These modes are very close in frequency with a graphene vibrational mode and therefore have significant localization in the carbon atoms as well (Table 3).

Specifically, the contribution of the OH from the water molecules has been pointed out at 3200 $cm^{-1}$ and the band at 1620 $cm^{-1}$ increase with the oxidation time as it has been previously reported. As one can observe, the increase of oxygen-related bands is pronounced after only 5 minutes of oxidation. The relative intensity of the groups' changes is also in agreement with the XPS results.

Figure 3:
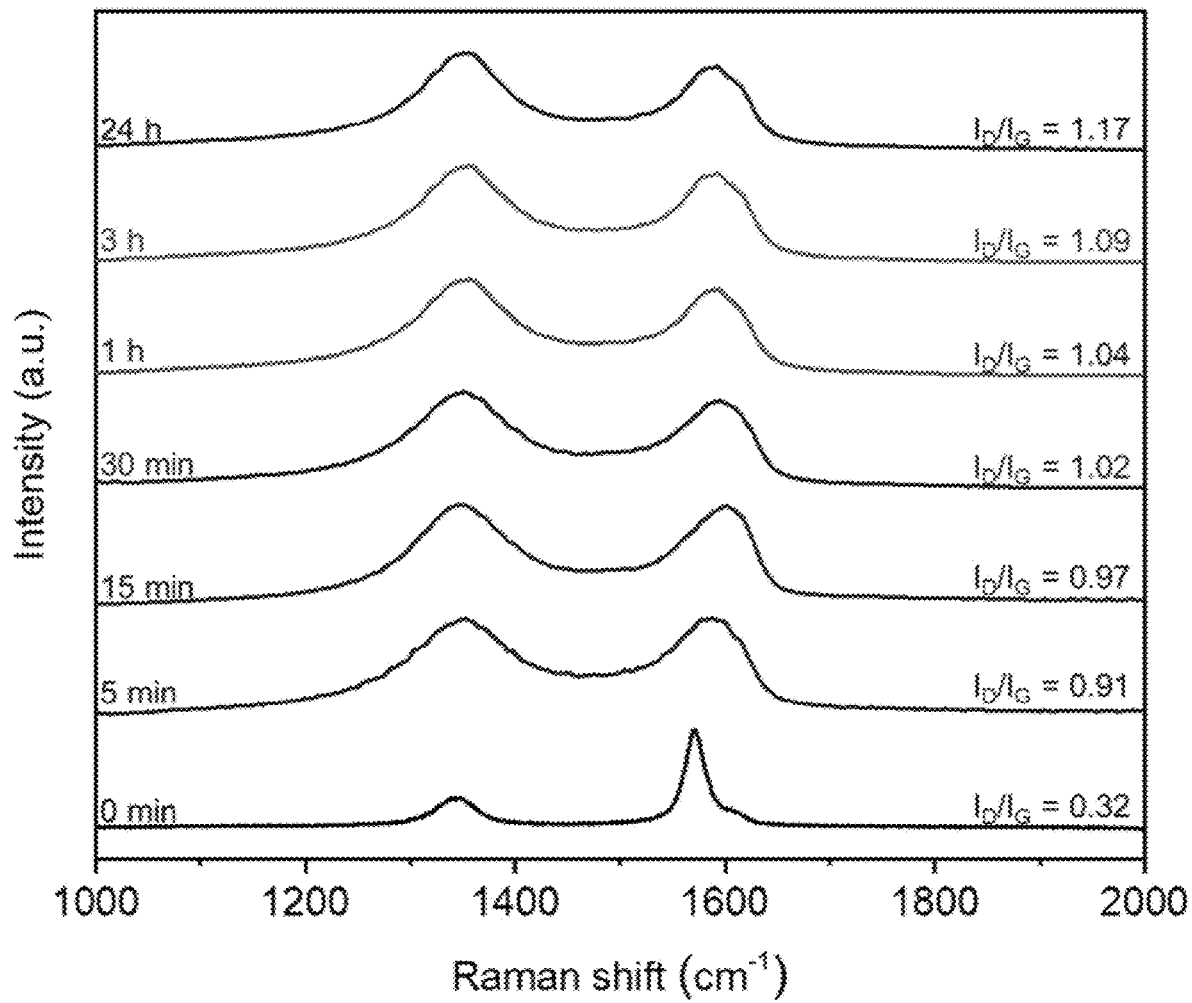
FIG. 3 depicts Raman spectra and the respective intensity of D-Raman peak and G-Raman peak ($I_D/I_G$) for graphene before (0 min) and after 5, 15, and 30 min and 1, 3, or 24 hours of reaction in accordance with certain embodiments described herein.

As expected, after the oxidation, the degree of disorder of graphene backbone is higher and corroborates the higher relative intensity of the D band a broader G band in the Raman spectra (FIG. 3). After 5 minutes of oxidation, a significant difference in the relative intensities, FWHM and $I_D/I_G$ of the D and G GO modes can be observed (Table 2).

Figure 5:
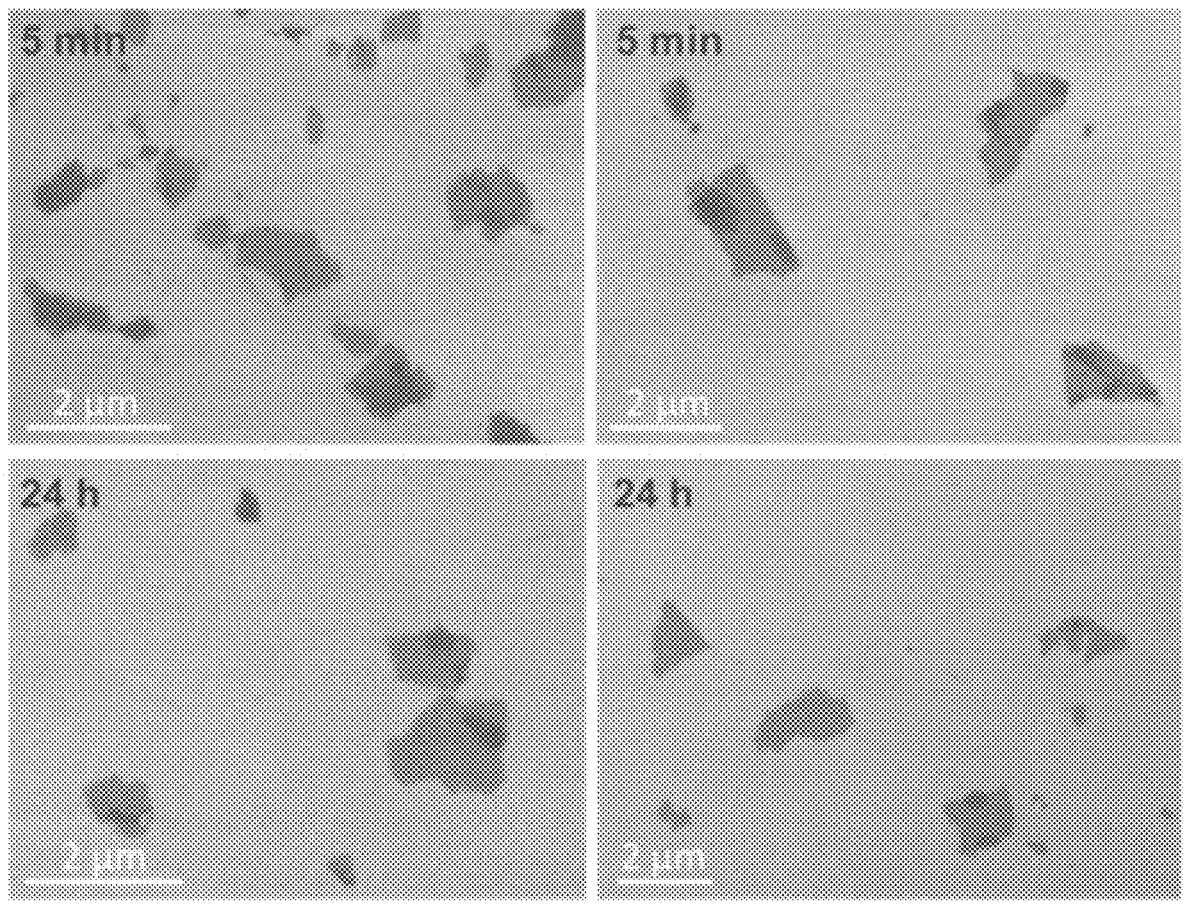
FIG. 5 depicts scanning electron microscopy (SEM) images of graphene after 5 minutes and 24 hours of oxidation in accordance with certain embodiments described herein.
Figure 6:
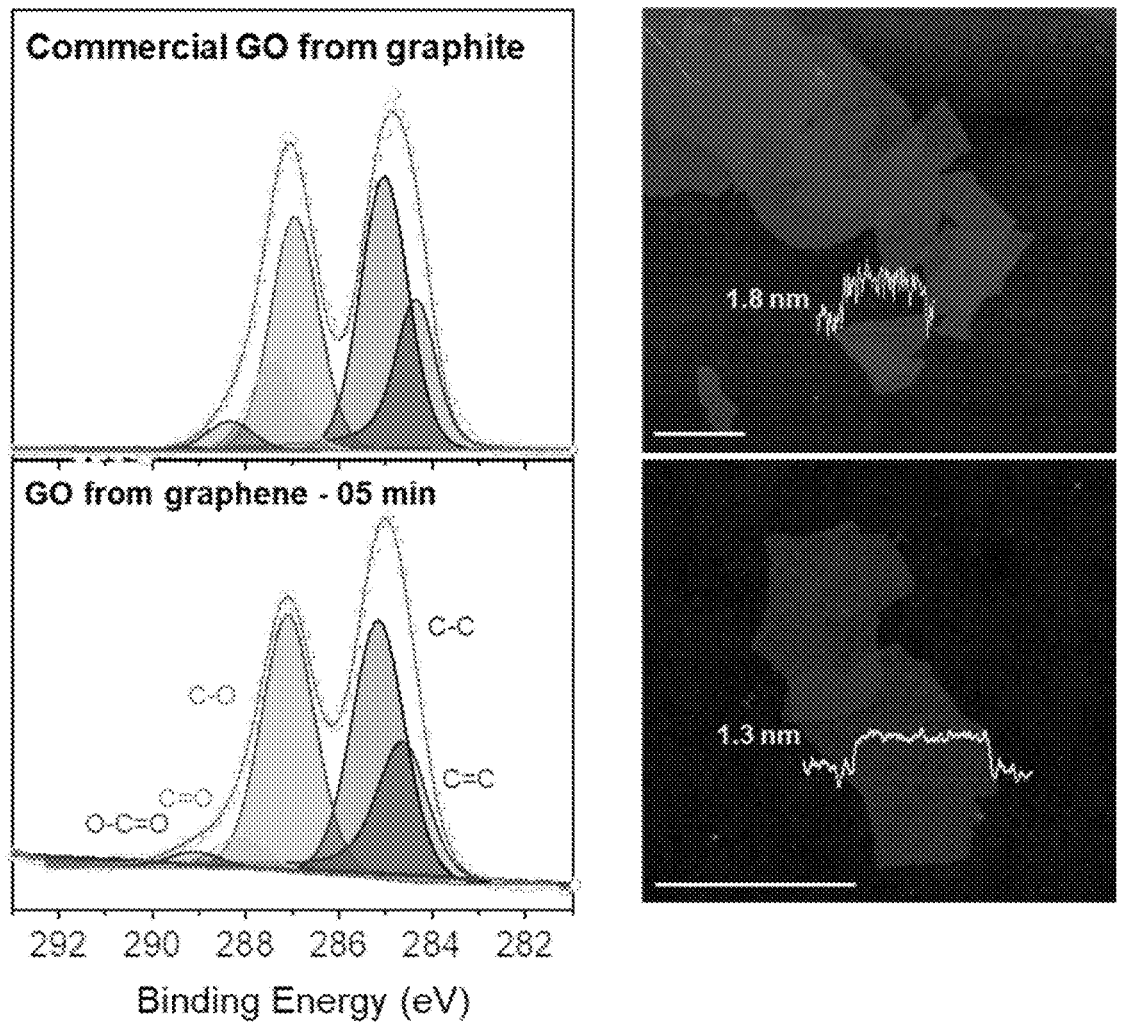
FIG. 6 depicts high resolution C1s XPS spectra comparing and AFM images of GO obtained from graphene (GO-5 min) in accordance with certain embodiments described herein and from graphite (commercial-GO). Scale bars are 1 μm.
Figure 7:
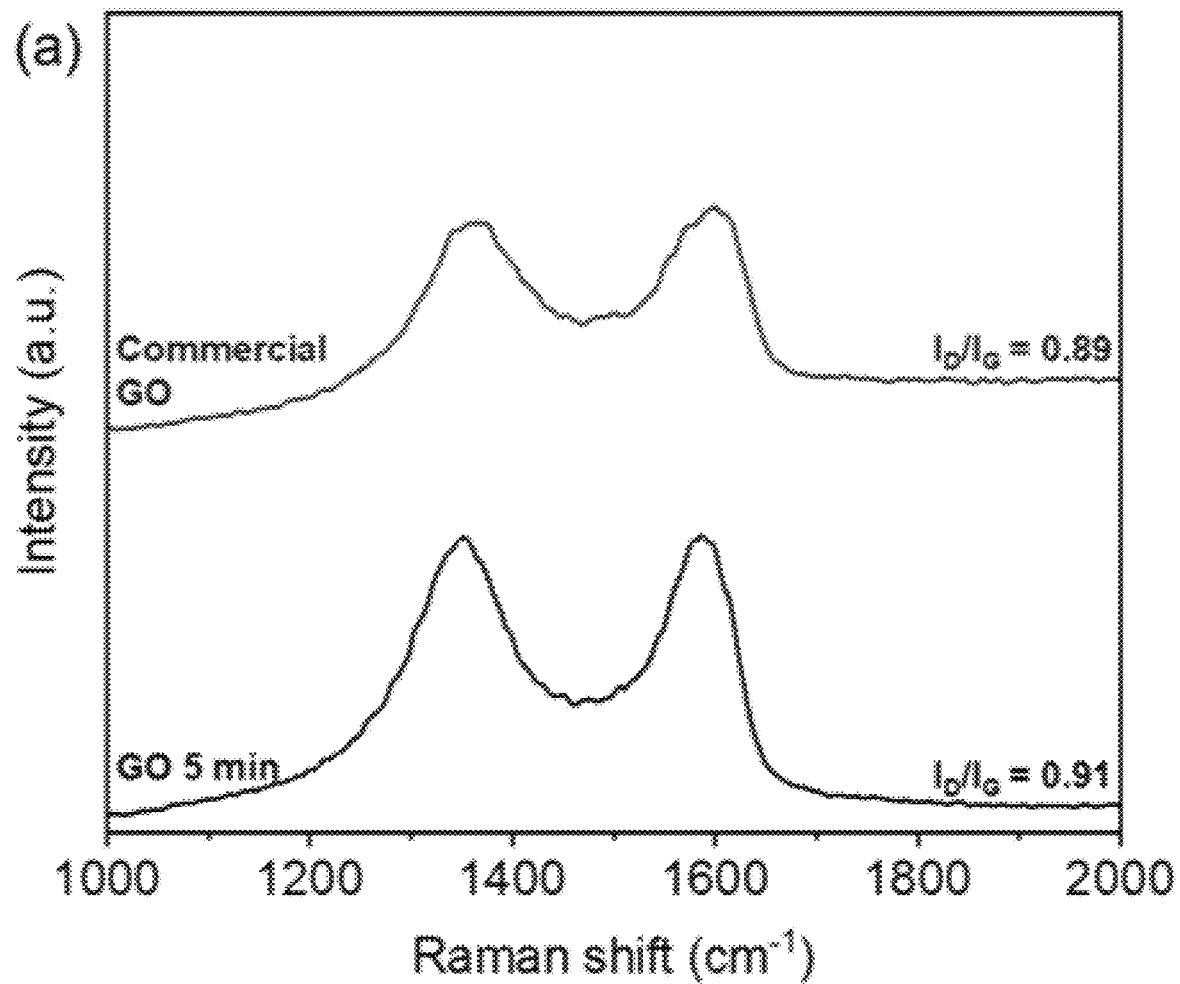
FIG. 7 depicts (a) Raman and (b) FTIR spectra comparing GO obtained from graphene (5 min of oxidation) in accordance with certain embodiments described herein and from graphite (commercial-GO).
Figure 7:
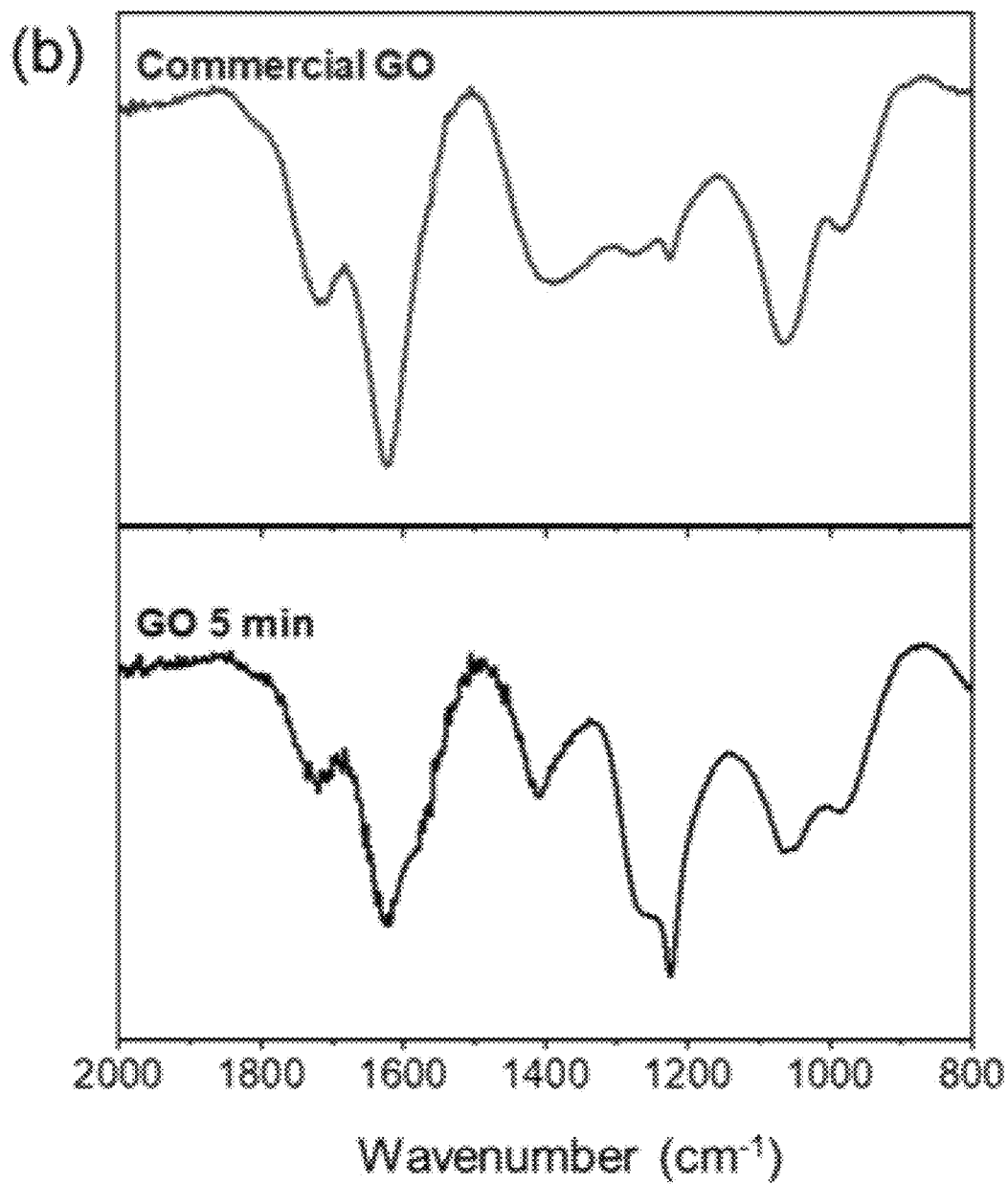

As the oxidation time increases, a slight increase in the $I_D/I_G$ ratio is observed. The 2D band at ~2683 cm$^{-1}$ is related to the number of layers of graphene and their relative orientations. The graphene spectrum is typical for few-layer graphene and this is expected due the sample preparation (dispersion in IPA and drop cast on Si/SiO$_2$ substrate), which can result in aggregation. After the oxidation, the sharp 2D band at ~2683 cm$^{-1}$ disappears, and some broad features between 2600 and 3000 cm', typical for GO, can be observed. The SEM images (FIG. 5) demonstrate the morphology of the structures do not change significantly from 5 minutes to 24 hours of oxidation reaction. Indeed, since graphene has a higher surface area compared to graphite, so that the use of sonication to complete the exfoliation process is not necessary and the structure is preserved from the beginning to the end of the synthesis (FIG. 8).

Figure 4:
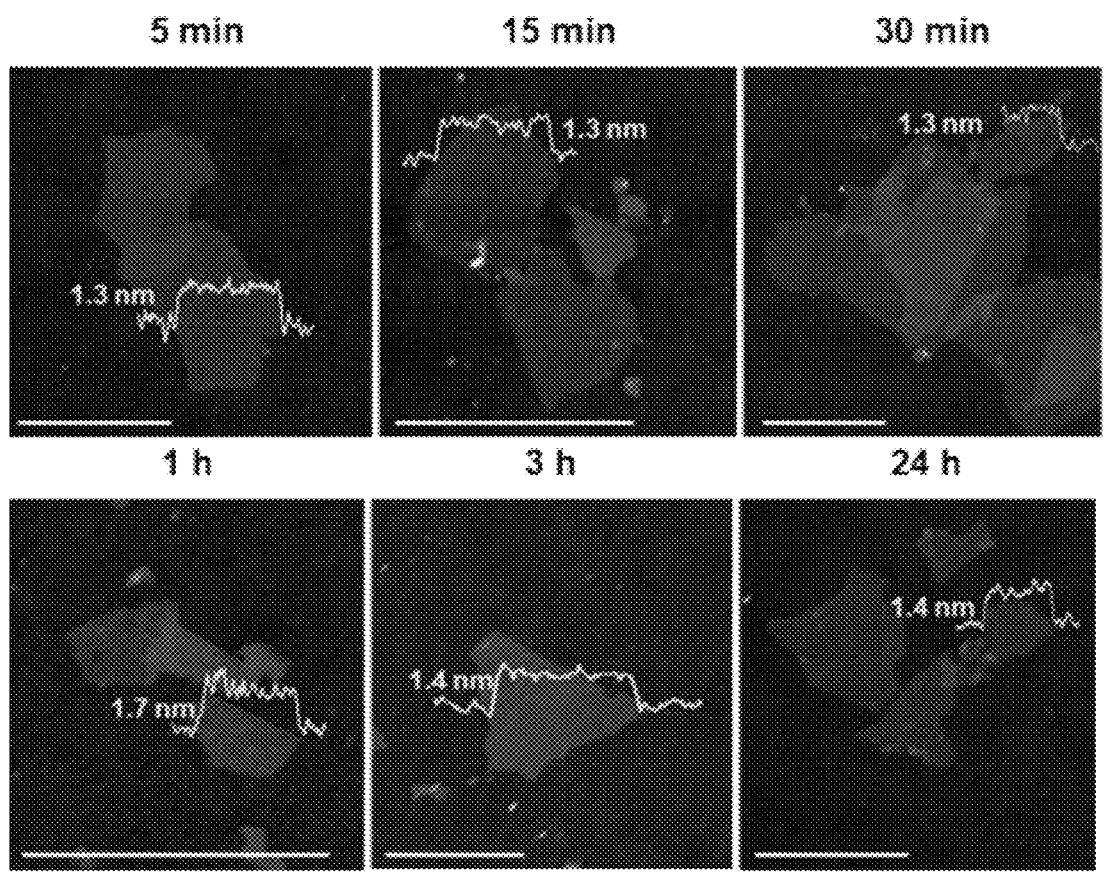
FIG. 4 depicts representative atomic force microscopy (AFM) images for GO obtained from graphene after 5, 15, and 30 min and 1, 3, or 24 hours of reaction. Scale bars are 1 μm.

However, as expected, GO from graphite presents larger sheets (lateral size) when compared to GO from graphene, since the graphene sheets used in this study have small lateral size of the order of 1 μm (FIG. 4). Importantly, as graphene layers are already unstacked before oxidation, the method disclosed herein advantageously does not require sonication to further separate stacked layers after the introduction of oxygenated functional groups, which prevent extra fractures and defects on the GO structure. Consequently, the original lateral size of graphene flakes is preserved even for highly oxidized structures, as indicated in the size distribution analysis (see FIG. 8).

The method described herein enables the synthesis of graphene oxide with a controllable degree of oxidation. The route consists of an environmentally friendly modified Hummers method, in which the carbon source is graphene, and not graphite flakes as in the standard processes. For this reason, nitric intercalant agents such as NaNO$_3$ and HNO$_3$ that are commonly used to expand the graphite structure and provide greater interlayer distance between the sheets, are not required, and, consequently, toxic gasses, such as NO$_2$/N$_2$O$_4$ are not generated, diminishing several safety and health concerns.

In addition, as graphene has a comparatively larger surface area per volume, the oxygenated groups are rapidly and homogeneously distributed over the graphene lattice, eliminating steps of sonication to further separate the layers. Consequently, the reaction time is reduced by orders of magnitude when compared with conventional methods.

This application opens up new avenues to explore environmentally friendly production routes as well as novel mild oxidation approaches to expand industrial applicability of GO, such as chemical sensors, solar cells, nanocomposite materials, energy storage, and biomedical applications.

Examples

Synthesis of Graphene Oxide Obtained Directly from Graphene

Graphene flakes were supplied by 2D Materials Pte. Ltd (2DM, Singapore). The chemical route to obtain graphene oxide directly from graphene consists of an environmentally friendly simplified Hummers method, in which 0.5 g of graphene flakes were added to 17 mL of concentrated H$_2$SO$_4$, with subsequently cooling up to 2° C. Next, 2.25 g of KMnO$_4$ were slowly added to the suspension. The system was kept under stirring at room temperature for different periods of time (such as 5 minutes, 15 minutes, 30 minutes, 1 hour, 3 hours and 24 hours), in which the graphene flakes were oxidized, followed by cooling to 2° C., and further dilution in water/H$_2$SO$_4$. To stop the oxidation, 2 mL of hydrogen peroxide (H$_2$O$_2$) was added to the system, leading to a color change in the dispersion from purple to yellowish. Lastly, the resulting GO suspensions were cleaned with 3 cycles of washing using HCl 10% and dialysis until pH 5.

Commercial Graphene Oxide

GO with different degree of oxidation were obtained from two different companies. The materials were used without further purification and are labelled as c-GO I and c-GO II.

Characterization Techniques

The samples were drop casted on silicon (Si) substrates for XPS and SEM analyses, and silicon substrate with 300 nm silicon dioxide (Si/SiO$_2$) for Raman spectroscopy and AFM.

For XPS analysis, the measurements were performed in a Kratos AXIX Ultra (Kratos Analytical Ltd., United Kingdom) equipment with a mono-chromatic source Al Kahv=1486.81 eV. The, Shirley type background, peak fitting and quantification were carried out using Casa-XPS software (version 2.1.19). The results of the XPS analysis are summarized in Table 1 below.

TABLE 1

Figure 9:
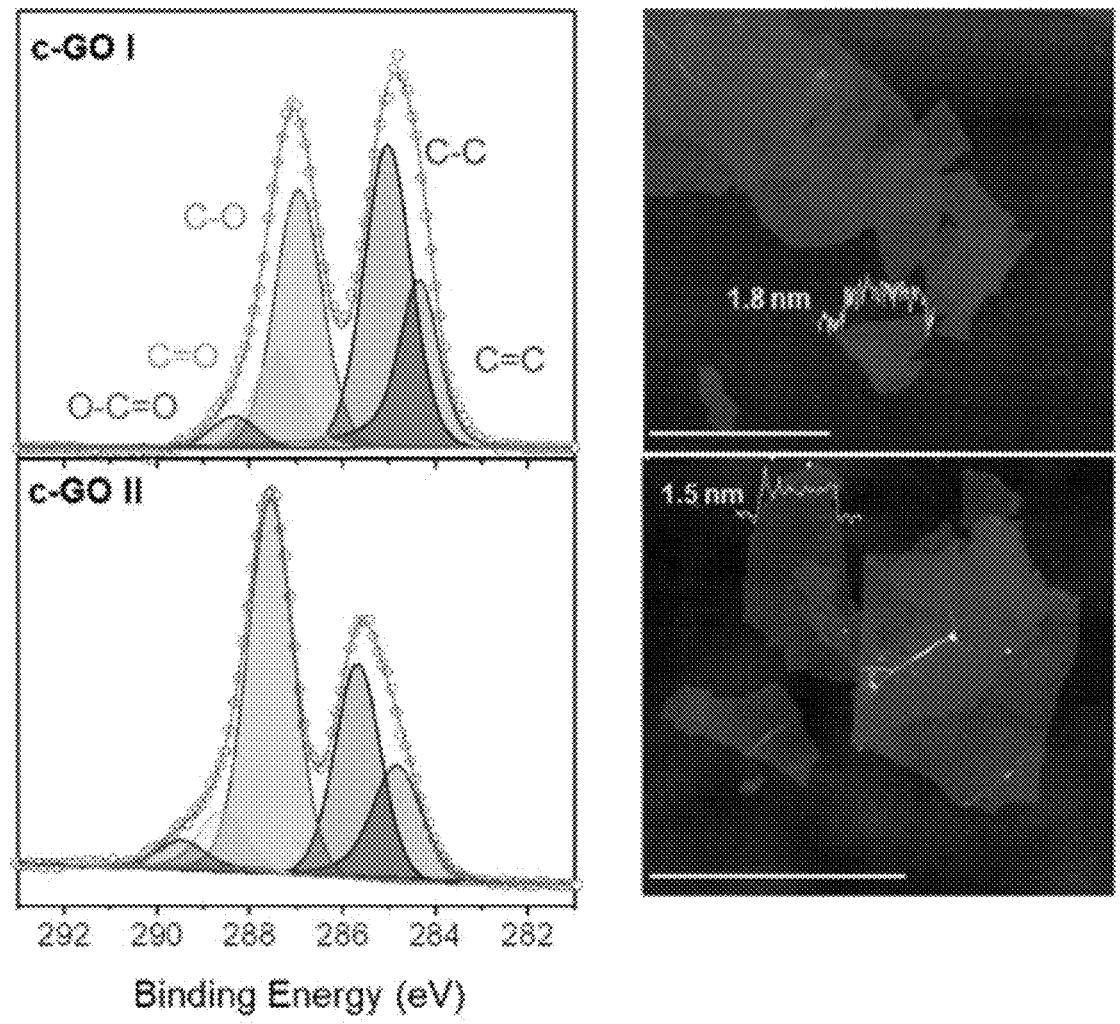
FIG. 9 depicts characterization high resolution C1s XPS and respective AFM images of commercial GO (c-GO). Scales bar are 2 μm.
Figure 10:
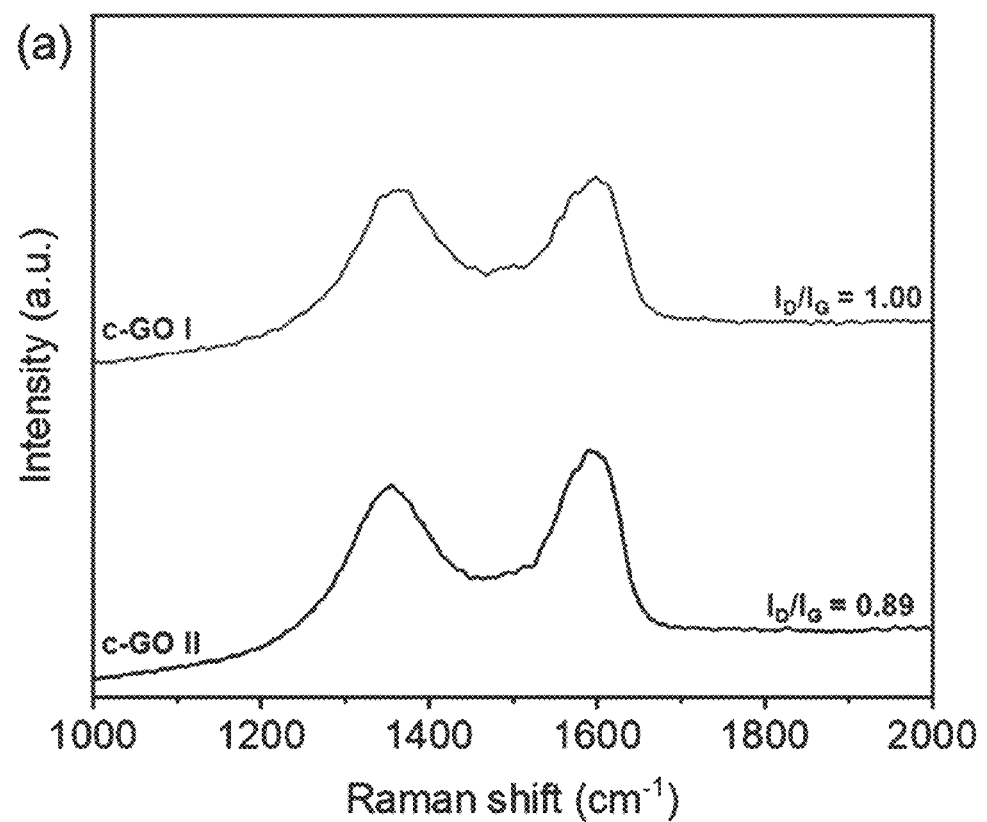
FIG. 10 depicts (a) Raman and (b) FTIR spectra of commercial GO I and II (c-GO I and c-GO II).
Figure 10:
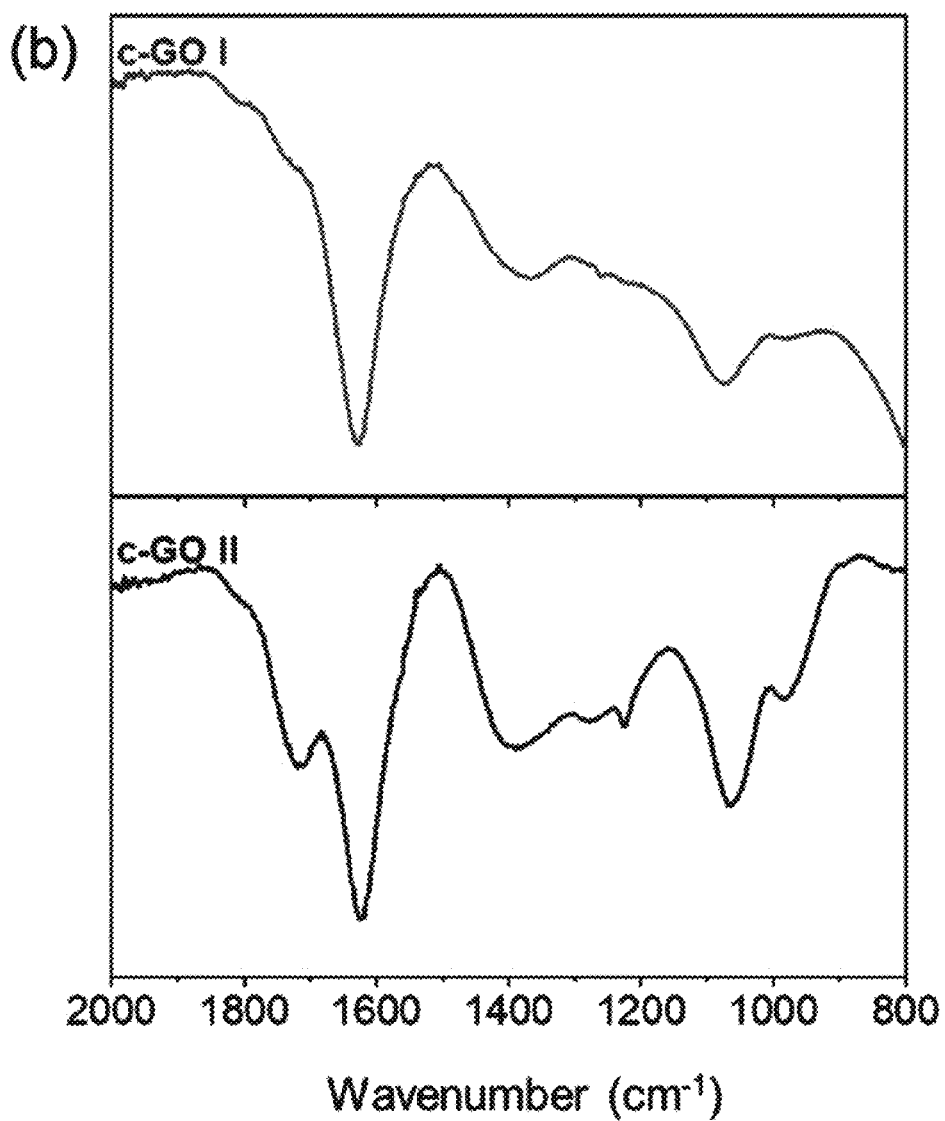

Binding energy of the deconvoluted C1s XPS peaks and their relative percentage area (in parentheses) for the spectra shown in FIGS. 2a and 9.

| Material | C=C (sp$^2$) | C—C (sp$^3$) | C—O | C=O | O—C=O | $\pi \rightarrow \pi^*$ |
|---|---|---|---|---|---|---|
| Graphene | 284.76 | 285.30 | 286.24 | 286.99 | 287.77 | 290.90 |
|  | (81.8%) | (10.5%) | (2.8%) | (1.4%) | (0.7%) | (2.8%) |
| GO 5 min | 284.6 | 285.15 | 287.08 | 288.17 | 289.10 |  |
|  | (26.7%) | (33.6%) | (33.5%) | (4.0%) | (2.1%) |  |
| GO 15 min | 284.41 | 285.15 | 287.11 | 288.18 | 288.86 |  |
|  | (26.3%) | (35.7%) | (33.3%) | (3.4%) | (1.3%) |  |
| GO 30 min | 284.47 | 285.25 | 287.15 | 288.07 | 289.17 |  |
|  | (23.8%) | (36.8%) | (31.6%) | (4.5%) | (3.3%) |  |
| GO 1 h | 284.82 | 285.77 | 287.71 | 288.93 | 289.86 |  |
|  | (22.1%) | (29.4%) | (40.4%) | (4.9%) | (3.2%) |  |
| GO 3 h | 284.89 | 285.89 | 287.83 | 288.85 | 289.68 |  |
|  | (21.7%) | (31.5%) | (39.9%) | (3.6%) | (3.3%) |  |
| GO 24 h | 284.94 | 286.26 | 288.39 | 288.79 | 290.26 |  |
|  | (9.4%) | (34.3%) | (46.6%) | (5.3%) | (4.4%) |  |

TABLE 1-continued

Binding energy of the deconvoluted C1s XPS peaks and their relative percentage area (in parentheses) for the spectra shown in FIGS. 2a and 9.

| Material | C=C (sp$^2$) | C—C (sp$^3$) | C—O | C=O | O—C=O | π → π* |
|---|---|---|---|---|---|---|
| c-GO I | 284.32 (23.6%) | 285.03 (33.3%) | 286.94 (28.5%) | 287.41 (10.9%) | 288.34 (3.7%) | |
| c-GO II | 284.81 (19.0%) | 285.67 (26.0%) | 287.55 (45.1%) | 288.59 (6.7%) | 289.49 (3.2%) | |

Results collected from Raman spectroscopy are shown in Table 2 below.

TABLE 2

Peak position, FWHM and $I_D/I_G$ ratio of the D and G bands of GO for the spectra shown in FIGS. 3 and 9.

| Material | C=C (sp$^2$) | C—C (sp$^3$) | C—O | C=O | O—C=O | π → π* |
|---|---|---|---|---|---|---|
| Graphene | 284.76 −81.80% | 285.3 −10.50% | 286.24 −2.80% | 286.99 −1.40% | 287.77 −0.70% | 290.9 −2.80% |
| GO 5 min | 284.6 −26.70% | 285.15 −33.60% | 287.08 −33.50% | 288.17 −4.00% | 289.1 −2.10% | |
| GO 15 min | 284.41 −26.30% | 285.15 −35.70% | 287.11 −33.30% | 288.18 −3.40% | 288.86 −1.30% | |
| GO 30 min | 284.47 −23.80% | 285.25 −36.80% | 287.15 −31.60% | 288.07 −4.50% | 289.17 −3.30% | |
| GO 1 h | 284.82 −22.10% | 285.77 −29.40% | 287.71 −40.40% | 288.93 −4.90% | 289.86 −3.20% | |
| GO 3 h | 284.89 −21.70% | 285.89 −31.50% | 287.83 −39.90% | 288.85 −3.60% | 289.68 −3.30% | |
| GO 24 h | 284.94 −9.40% | 286.26 −34.30% | 288.39 −46.60% | 288.79 −5.30% | 290.26 −4.40% | |
| c-GO I | 284.32 −23.60% | 285.03 −33.30% | 286.94 −28.50% | 287.41 −10.90% | 288.34 −3.70% | |
| c-GO II | 284.81 −19.00% | 285.67 −26.00% | 287.55 −45.10% | 288.59 −6.70% | 289.49 −3.20% | |

For the SEM analysis, a FESEM VERIOS 460 with accelerating voltage of 2.0 kV and current 100 pA was used. For Fourier transform infrared spectroscopy (FTIR), the aqueous suspensions of GO were freeze dried, prepared by KBr disc method and the spectra were obtained in a Bruker equipment. Atomic force microscopy (AFM) measurements were carried out in a Bruker Dimension Icon Microscope operated in ScanAsyst tapping mode and scan lines of 512 under ambient conditions. Confocal Raman spectroscopy was performed in a WITec Alpha 300R, with excitation wavelength of 532 nm and a 100× objective.

Computational Methods

The main different functional groups present in graphene oxide were modelled and their vibrational frequencies from first-principles calculated, for comparison with the FTIR absorption bands. First-principles calculations were based on the framework of DFT, as implemented in Quantum ESPRESSO v. 6.5, with the PBE exchange and correlation functional. Ultra-soft pseudo-potentials were used for carbon and oxygen, while a norm-conserving Troullier-Martins pseudo-potential was used for hydrogen. A plane wave basis set with kinetic energy cutoffs of 40 Ry was employed for the wave functions. The Brillouin zone was sampled using a Γ-centered 6×6×1 Monkhorst-Pack (MP) grid for all calculations. A supercell periodicity of 20 Angstrom in the direction perpendicular to the monolayer was used to avoid spurious interactions between replicas. Both supercell and flake models were used, and the vibrational modes for different functional groups were obtained by diagonalizing the dynamical matrix for a select number of neighboring atoms. The calculated vibration modes of the various functional groups in GO are summarized in Table 3.

TABLE 3

Calculated local vibrational modes (LVMs) of oxygen and hydrogen functional groups in graphene. Only vibrational modes with frequencies above 600 cm$^{-1}$ and with localization (loc.) on O and H of 2% or larger are shown. Basal plane functional groups were modelled using a supercell model and edge functional groups were modelled using a graphene flake model.

| Functional Group | Symbol | Model | O/H-LVMs (cm$^{-1}$) | Loc. (%) |
|---|---|---|---|---|
| Epoxy | >O | Supercell | 1254 | 2.8 |
| | | | 892 | 2.3 |
| | | | 801 | 4.1 |
| | | | 717 | 3.9 |
| | | | 699 | 2 |
| | | | 696 | 2 |
| | | | 614 | 4.7 |
| Hydroxyl (surface) | —OH | Supercell | 3632 | 10 |
| | | | 1509 | 2 |
| | | | 771-1319 | >.0 |
| Hydroxyl (edge) | —OH | flake | 3575 | 10 |
| | | | 1615 | 2.1 |
| | | | 1596 | 2.1 |
| | | | 1382-1488 | >2.0 |
| | | | 1109 | 7.5 |
| | | | 1039 | 2.4 |
| | | | 814 | 2.8 |
| | | | 775 | 2.5 |
| | | | 651 | 2.1 |

TABLE 3-continued

Calculated local vibrational modes (LVMs) of oxygen and hydrogen functional groups in graphene. Only vibrational modes with frequencies above 600 cm$^{-1}$ and with localization (loc.) on O and H of 2% or larger are shown. Basal plane functional groups were modelled using a supercell model and edge functional groups were modelled using a graphene flake model.

| Functional Group | Symbol | Model | O/H-LVMs (cm$^{-1}$) | Loc. (%) |
|---|---|---|---|---|
| Carbonyl | —COOH | | 3508 | 9.9 |
| | | | 1692 | 5.4 |
| | | | 1230-1335 | >2.0 |
| | | | 1149 | 6 |
| | | | 778-997 | >2.0 |
| | | | 671-732 | >2.0 |

What is claimed is:

1. A method for preparing graphene-oxide, the method comprising: contacting graphene and at least one oxidant in a solution comprising at least one acid solvent at a temperature between 2-25° C. for a period of between 1 minute to 30 minutes, thereby forming graphene-oxide, wherein: the graphene is selected from the group consisting of graphene flakes, graphene sheets, fullerenes, graphene nanotubes, graphene nanoscrolls, and graphene nanoribbons; and the method does not comprise sonication.

2. The method of claim 1, wherein the graphene consists of 10 or less layers of graphene or graphene aggregates comprising graphene particles consisting of 10 or less layers of graphene.

3. The method of claim 1, wherein the solution is substantially free of graphite.

4. The method of claim 1, wherein the solution does not comprise nitrate salts or nitric acid.

5. The method of claim 1, wherein the at least one oxidant is selected from the group consisting of permanganate, ferrate, chlorate, chlorite, ruthenium tetroxide, hydrogen peroxide ($H_2O_2$) and combinations thereof.

6. The method of claim 1, wherein the at least one oxidant is potassium permanganate, potassium chlorate, or sodium chlorate.

7. The method of claim 1, wherein the at least one acid solvent is selected from the group consisting of sulfuric acid, phosphoric acid, chlorosulfonic acid, fluorosulfonic acid, and combinations thereof.

8. The method of claim 1, wherein the method comprises: contacting graphene flakes and at least one oxidant selected from the group consisting of permanganate, ferrate, chlorate, chlorite, osmium tetroxide, ruthenium tetroxide, and combinations thereof in a solution comprising at least one acid solvent selected from the group consisting of sulfuric acid, phosphoric acid, chlorosulfonic acid, fluorosulfonic acid, trifluoromethanesulfonic acid, and combinations thereof; at a temperature between 2-25° C. thereby forming graphene-oxide, wherein each of the graphene flakes independently consists of 10 or less layers of graphene.

9. The method of claim 8, wherein the solution is substantially free of graphite.

10. The method of claim 8, wherein the solution does not comprise nitrate salts.

11. The method of claim 1, wherein the method comprises: contacting graphene flakes with potassium permanganate in a solution comprising sulfuric acid at a temperature between 2-25° C. for a period of between 1 minute to 30 minutes, thereby forming graphene-oxide, wherein each of the graphene flakes independently consists of 10 or less layers of graphene; and the solution is substantially free of graphite.

12. The method of claim 11, wherein the solution consists of concentrated sulfuric acid.

13. The method of claim 11, wherein the graphene flakes and potassium permanganate are present in the solution in a mass ratio of 10:1 to 1:10.

14. The method of claim 11, wherein the graphene flakes are present in the solution at a concentration of 0.1-5% m/v.

15. The method of claim 1, wherein the method comprises: contacting graphene flakes with potassium permanganate in a solution consisting of concentrated sulfuric acid at a temperature between 2-25° C. for a period of between 1 minute to 30 minutes, thereby forming graphene-oxide, wherein the graphene flakes and potassium permanganate are present in the solution in a mass ratio of 1:4 to 1:5; the graphene flakes are present in the solution at a concentration of 2-4% m/v; each of the graphene flakes independently consists of 10 or less layers of graphene; and the solution is substantially free of graphite.

* * * * *